Figure 1:
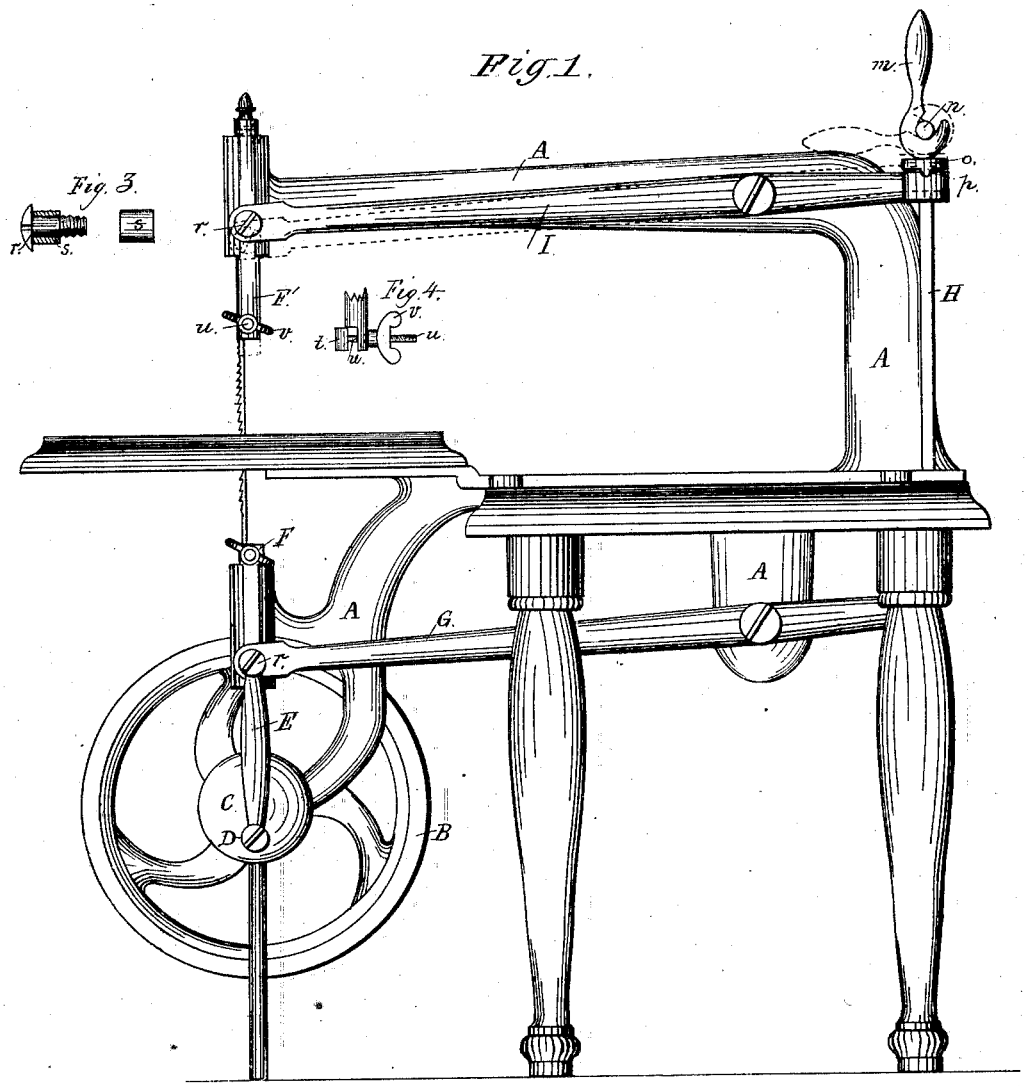

E. J. WESCOTT & W. H. McGREGOR.
Scroll-Sawing Machine.

No. 164,787. Patented June 22, 1875.

Witnesses
G. T. Smallwood Jr
John Robey Jr

Inventors.
Edwin J. Wescott
and
Wm. H. McGregor
by John J. Halsted
their Atty.

UNITED STATES PATENT OFFICE.

EDWIN J. WESCOTT, OF HYDE PARK, AND WILLIAM H. McGREGOR, OF BRAINTREE, MASSACHUSETTS.

IMPROVEMENT IN SCROLL-SAWING MACHINES.

Specification forming part of Letters Patent No. 164,787, dated June 22, 1875; application filed May 20, 1875.

*To all whom it may concern:*

Be it known that we, EDWIN J. WESCOTT, of Hyde Park, and WM. H. McGREGOR, of Braintree, in the county of Norfolk, State of Massachusetts, have invented new and useful Improvements in Scroll-Sawing Machines; and we do hereby declare that the following, taken in connection with the drawings which accompany and form part of this specification, is a description of our invention sufficient to enable those skilled in the art to practice it.

Our improvements consist in certain devices and combinations of devices tending to make the machines more reliable and efficient in action.

A is the frame of the machine mounted on an appropriate table; B, a driving-pulley; C, a crank-pulley; D, a crank, and E a link which imparts motion from such crank, not only to the reciprocating stock F, in which the lower end of the saw is clamped or screwed, but also to the lever G, the outer end of this lever G being adjustably connected, by a connecting-rod, H, to the upper lever I, whose forward end is connected to the reciprocating stock F', to which the upper end of the saw is clamped or secured. The two levers, being nearly parallel, form, with their rod and saw connections, approximately a parallelogram. The rod H has a novel set of devices for adjustably connecting to it one of the levers, but preferably the upper lever I—namely, a screw-thread, $k$, on the end of the rod enters a threaded hole made through a trunnion-nut, $l$, and a forked cam-lever, $m$, receives the bearings $n$ of this nut. The cam rests on a self-adjusting washer, $o$, which has a ridge or swell, $p$, adapted to lodge or rest in a corresponding depression or groove, $q$, made in the end of the lever, as shown, and it may be free to rock in this depression.

The trunnion may be screwed down as far as desired, and the cam-lever then introduced to its place beneath it, as shown; or the lever may be first put in place, and the lever may serve as a handle by which the trunnion is turned upon the screw; and then, if at any time, any further tightening or adjusting of the saw be needed, it is readily effected by simply turning the lever upward, so as to bring a thicker part of the cam between the nut and the washer.

It will be seen that the most delicate adjustments may thus be made, and to any required extent, and the washer, by its ridge, always adjusts itself; that the devices are strong and not likely to get out of position or out of order.

The forward ends of the levers are connected to the stocks or slides F F', respectively, by screws $r$, having friction-rolls $s$ thereon, the slots or openings in the levers for the reception of these screws and rolls being sufficiently elongated to compensate for the small arc in which the ends of the levers move. This arrangement of rolls allows great ease of movement.

To hold the saw in place the end of each of the slides F F' has a piece, $t$, with a flat vertical inner face fitting a corresponding face of a rabbet cut in the end of the stock, and the piece $t$ has a threaded pin, $u$, screwed to it, which projects through a hole in the stock, and a thumb-nut, $v$, serves to clamp these parts and the end of the saw tightly together, as shown.

Figure 2:
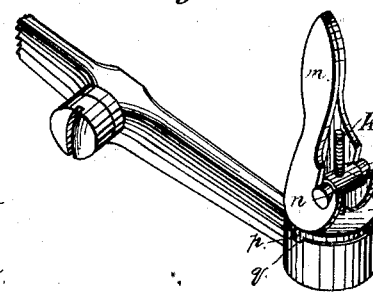

Figures 2, 3, and 4 show detail views.

We claim—

1. In combination with the levers and their connecting-rod H, the trunnion-nut, cam-lever, and washer, applied and operating substantially as and for the purpose set forth.

2. In combination with the levers and the sliding stocks F F', the friction-rolls $s$, surrounding the screws $r$, and lodged with elongated slots in the ends of the levers.

EDWIN J. WESCOTT.
WILLIAM H. McGREGOR.

Witnesses:
CHARLES M. CHAPIN,
W. R. WILLIAMS.